(12) United States Patent
Wang et al.

(10) Patent No.: US 12,542,418 B2
(45) Date of Patent: Feb. 3, 2026

(54) LATERAL-OPTICAL-MODE-CONTROLLED HIGH-POWER SEMICONDUCTOR DEVICE AND MANUFACTURING METHOD THEREOF

(71) Applicants: SUZHOU EVERBRIGHT PHOTONICS CO., LTD., Jiangsu (CN); EVERBRIGHT INSTITUTE OF SEMICONDUCTOR PHOTONICS CO., LTD., Jiangsu (CN)

(72) Inventors: Jun Wang, Suzhou (CN); Wuling Liu, Suzhou (CN); Shaoyang Tan, Suzhou (CN); Bangguo Wang, Suzhou (CN); Wu Zhao, Suzhou (CN); Xinsheng Liao, Suzhou (CN)

(73) Assignees: SUZHOU EVERBRIGHT PHOTONICS CO., LTD., Suzhou (CN); EVERBRIGHT INSTITUTE OF SEMICONDUCTOR PHOTONICS CO., LTD., Suzhou (CN)

( * ) Notice: Subject to any disclaimer, the term of this patent is extended or adjusted under 35 U.S.C. 154(b) by 190 days.

(21) Appl. No.: 18/572,645

(22) PCT Filed: May 29, 2023

(86) PCT No.: PCT/CN2023/096788
§ 371 (c)(1),
(2) Date: Dec. 20, 2023

(87) PCT Pub. No.: WO2023/198225
PCT Pub. Date: Oct. 19, 2023

(65) Prior Publication Data
US 2024/0291234 A1 Aug. 29, 2024

(30) Foreign Application Priority Data

Apr. 15, 2022 (CN) .......................... 202210392751.7

(51) Int. Cl.
*H01S 5/042* (2006.01)
*H01S 5/024* (2006.01)

(52) U.S. Cl.
CPC ...... *H01S 5/04254* (2019.08); *H01S 5/02476* (2013.01)

(58) Field of Classification Search
CPC ............. H01S 5/04254; H01S 5/02476; H01S 2301/176; H01S 5/02461; H10H 20/01;
(Continued)

(56) References Cited

U.S. PATENT DOCUMENTS 6,639,926 B1 10/2003 Shimoyama et al.
2001/0043631 A1 11/2001 Kitamura et al.
(Continued)

FOREIGN PATENT DOCUMENTS

CN 101794967 A 8/2010
CN 102545052 A 7/2012
(Continued)

OTHER PUBLICATIONS

CN Office Action dated May 19, 2022 as received in Application No. 202210392751.7.
(Continued)

*Primary Examiner* — Yuanda Zhang
(74) *Attorney, Agent, or Firm* — Maschoff Brennan

(57) ABSTRACT

The present invention discloses a lateral-optical-mode-controlled high-power semiconductor device, a manufacturing method thereof and a semiconductor packaging structure. The lateral-optical-mode-controlled high-power semiconductor device comprises a semiconductor substrate layer; an
(Continued)

active layer arranged upon the semiconductor substrate layer; a front electrode layer arranged on a side of the active layer away from the semiconductor substrate layer, the front electrode layer including an electrode injection region; wherein thickness of the electrode injection region decreases progressively from a central part of the electrode injection region to an edge part of the electrode injection region along a slow axis direction of the lateral-optical-mode-controlled high-power semiconductor device. The semiconductor device has high light-output brightness, high beam quality, as well as low cost and high degree of integration.

14 Claims, 4 Drawing Sheets

(58) Field of Classification Search
CPC .............. H10H 20/831; H10H 20/8581; H10H 20/8582; H10H 20/032

See application file for complete search history.

(56) References Cited

U.S. PATENT DOCUMENTS

| | | |
|---|---|---|
| 2013/0077647 A1 | 3/2013 | Jikutani et al. |
| 2013/0243020 A1* | 9/2013 | Kim .................. H01S 5/02375 |
| | | 372/44.01 |
| 2022/0123529 A1 | 4/2022 | Ebbecke |
| 2024/0291234 A1 | 8/2024 | Wang et al. |

FOREIGN PATENT DOCUMENTS

| | | |
|---|---|---|
| CN | 108336641 A | 7/2018 |
| CN | 108767658 A | 11/2018 |
| CN | 109616869 A | 4/2019 |
| CN | 113381296 A | 9/2021 |
| CN | 113424379 A | 9/2021 |
| CN | 114497310 A | 5/2022 |

OTHER PUBLICATIONS

International Search Report and Written Opinion of the International Searching Authority dated Sep. 8, 2023 as received in Application No. PCT/CN2023/096788.

* cited by examiner

LATERAL-OPTICAL-MODE-CONTROLLED HIGH-POWER SEMICONDUCTOR DEVICE AND MANUFACTURING METHOD THEREOF

CROSS-REFERENCE TO RELATED APPLICATIONS

The present application claims the priority of the Chinese patent application filed to CNIPA on Apr. 15, 2022, with the application number of 202210392751.7 and the invention name of "Lateral-optical-mode-controlled high-power semiconductor device and manufacturing method thereof", which is incorporated herein by reference in its entirety.

TECHNICAL FIELD

The present application relates to the technical field of semiconductors, particularly relates to a lateral-optical-mode-controlled high-power semiconductor device and a manufacturing method thereof.

BACKGROUNDS

Semiconductor light emission structure is a kind of device which uses certain semiconductor material as working substance and generates excited emission, and its working principle is: by means of a certain excitation mode, a particle number inversion of non-equilibrium carriers is realized between energy bands (a conduction band and a valence band) of semiconductor material, or between an energy band of semiconductor material and an energy level of impurity (acceptor or donor). When a large number of electrons and holes in the state of particle number inversion recombines with each other, it results in occurrence of excited emission. Semiconductor light emission devices are widely used because of their small size and high electrical-optical conversion efficiency.

In the prior art, high-power semiconductor devices cannot achieve high light-output brightness and high beam quality at the same time of having low cost and high degree of integration.

SUMMARY

Therefore, the technical problem to be solved by the present application is to overcome the defect that devices in the prior art cannot achieve high light-output brightness and high beam quality at the same time of having low cost and high degree of integration, thereby providing a lateral-optical-mode-controlled high-power semiconductor device and a manufacturing method thereof.

The present application provides a lateral-optical-mode-controlled high-power semiconductor device which comprises: a semiconductor substrate layer; an active layer, arranged upon the semiconductor substrate layer; a front electrode layer, arranged on a side of the active layer away from the semiconductor substrate layer, the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively.

Optionally, from a central part of the electrode injection region to an edge part of the electrode injection region along a slow axis direction of the lateral-optical-mode-controlled high-power semiconductor device, a surface of the electrode injection region away from the active layer has a stepped shape; or, the electrode injection region has a trapezoid shape in a cross-section perpendicular to a light emission direction; or, the electrode injection region has a conical shape in a cross-section perpendicular to a light emission direction; or, the electrode injection region has a semicircular shape in a cross-section perpendicular to a light emission direction.

Optionally, a ratio of thickness of the central part of the electrode injection region to thickness of the edge part of the electrode injection region is 2:1~20:1.

Optionally, thickness of the central part of the electrode injection region is 2 microns to 10 microns, and thickness of the edge part of the electrode injection region is 0.4 micron to 5 microns.

Optionally, the device further comprises: a weld layer, arranged on a surface on a side of the electrode injection region away from the active layer, and from a central part of the weld layer to an edge part of the weld layer along a slow axis direction of the lateral-optical-mode-controlled high-power semiconductor device, thickness of the weld layer increases progressively.

Optionally, the front electrode layer further comprises non-injection electrode regions arranged on both sides of the electrode injection region in the slow axis direction; the lateral-optical-mode-controlled high-power semiconductor device further comprises: a thermal compensation layer, arranged on a side of each non-injection electrode region towards the active layer and in contact with each non-injection electrode region; thermal conductivity of the thermal compensation layer is lower than that of the weld layer.

Optionally, the device further comprises: an upper confinement layer arranged between the active layer and the front electrode layer; parts of the upper confinement layer positioned on both sides of the electrode injection region along the slow axis direction are each provided with a groove, and a part of the upper confinement layer positioned under the electrode injection region and between the grooves forms a ridge-shaped region; each thermal compensation layer is arranged in one of the grooves.

Optionally, thickness of the thermal compensation layer is 1 micron to 10 microns.

Optionally, material of the thermal compensation layer comprises silicon oxide.

Optionally, the thermal compensation layer comprises a first compensation region and a second compensation region juxtaposed in the slow axis direction, and a distance from the first compensation region to the electrode injection region is less than a distance from the second compensation region to the electrode injection region; thickness of the second compensation region is greater than that of the first compensation region.

Optionally, a surface on a side of the first compensation region away from the active layer has a stepped shape.

Optionally, the thermal compensation layer comprises a plurality of first compensation sub-layers and a plurality of second compensation sub-layers, thermal conductivity of each first compensation sub-layer is greater than that of each second compensation sub-layer, the plurality of first compensation sub-layers and the plurality of second compensation sub-layers are alternately arranged in a direction perpendicular to the semiconductor substrate layer.

The present application further provides a method for manufacturing a lateral-optical-mode-controlled high-power semiconductor device, comprising: providing a semiconductor substrate layer; forming an active layer upon the semiconductor substrate layer; forming a front electrode layer on a side of the active layer away from the semiconductor substrate layer, wherein the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively.

Optionally, the process of forming a front electrode layer on a side of the active layer away from the semiconductor substrate layer comprises: forming an initial front electrode film on a side of the active layer away from the semiconductor substrate layer, wherein the initial front electrode film comprises an initial electrode injection region; etching the initial electrode injection region to cause the initial electrode injection region to be formed into the electrode injection region and cause the initial front electrode film to be formed into the front electrode layer.

Optionally, from a central part of the electrode injection region to an edge part of the electrode injection region along a slow axis direction of the lateral-optical-mode-controlled high-power semiconductor device, a surface of the electrode injection region away from the active layer has a stepped shape; the step of etching the initial electrode injection region comprises: forming a photoresist layer on the initial front electrode film; patterning the photoresist layer to form an opening in the photoresist layer, wherein the opening exposes a part of the initial electrode injection region; taking the patterned photoresist layer as a mask and etching a partial thickness of the initial electrode injection region under the opening; repeating the steps of patterning the photoresist layer and etching a partial thickness of the initial electrode injection region under the opening, until a surface of the initial electrode injection region exposed by the opening is formed into a stepped shape; and then removing the photoresist layer.

Optionally, the electrode injection region has a trapezoid shape in a cross-section perpendicular to a light emission direction; or, the electrode injection region has a conical shape in a cross-section perpendicular to a light emission direction; or, the electrode injection region has a semicircular shape in a cross-section perpendicular to a light emission direction.

Optionally, providing a heat sink; welding the heat sink onto the front electrode layer by using a weld layer; wherein, from a central part of the weld layer to an edge part of the weld layer along a slow axis direction of the lateral-optical-mode-controlled high-power semiconductor device, thickness of the weld layer in a region corresponds to the electrode injection region increases progressively.

Optionally, the front electrode layer further comprises non-injection electrode regions arranged on both sides of the electrode injection region in the slow axis direction; the method for manufacturing a lateral-optical-mode-controlled high-power semiconductor device further comprises: before forming the front electrode layer, forming a thermal compensation layer on a part of the active layer on a side thereof away from the semiconductor substrate layer; and after forming the front electrode layer, the thermal compensation layer becomes arranged on a side of each non-injection electrode region towards the active layer and in contact with each non-injection electrode region, wherein thermal conductivity of the thermal compensation layer is lower than that of the weld layer.

Optionally, the method further comprises: before forming the thermal compensation layer, forming an upper confinement layer on a side of the active layer away from the semiconductor substrate layer, and forming grooves in the upper confinement layer to delimit a ridge-shaped region; the step of forming a thermal compensation layer on a part of the active layer on a side thereof away from the semiconductor substrate layer comprises: forming the thermal compensation layer in each of the grooves.

Optionally, the active layer comprises a first active region and second active regions arranged on both sides of the first active region in a slow axis direction; the process of forming the thermal compensation layer comprises: forming an initial thermal compensation film on a side of each of the second active regions away from the semiconductor substrate layer, wherein the initial thermal compensation film exposes the first active region, the initial thermal compensation film comprises a first initial thermal compensation region and a second initial thermal compensation region juxtaposed in the slow axis direction, a distance from the first initial thermal compensation region to the first active region is less than a distance from the second initial thermal compensation region to the first active region; etching a surface of the first initial thermal compensation region on a side thereof away from the second active region to cause the first initial thermal compensation region to be formed into a first compensation region and cause the second initial thermal compensation region to be formed into a second compensation region, so as to cause the initial thermal compensation film to be formed into the thermal compensation layer; wherein thickness of the second compensation region is greater than that of the first compensation region.

The technical solution of the present application has the following beneficial effects:

The technical solution of the present application provides a lateral-optical-mode-controlled high-power semiconductor device, wherein the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively. In this way, thermal conductivity of a central part of the electrode injection region is increased, a temperature of the central part of the electrode injection region is decreased, and a temperature gradient of the active layer directly under the electrode injection region is decreased along the slow axis direction, thereby reducing the thermal lens effect. Because of reduction of the thermal lens effect, a divergence angle in the slow axis direction can be reduced, and also, an order of optical modes along the slow axis direction can be reduced under the same electrical current, which improves the beam quality and increases the light-output brightness of the semiconductor device.

Further, since thermal conductivity of the thermal compensation layer is lower than that of the weld layer, which means that the thermal conductivity of the thermal compensation layer is relatively low, and as a result, the semiconductor film layers directly under the thermal compensation layer conducts less heat from the non-injection electrode region, thereby causing the temperature gradient of the active layer directly under the thermal compensation layer to be reduced along the slow axis direction, and causing the variation gradient of refractive index of the semiconductor film layers directly under the thermal compensation layer to be reduced along the slow axis direction, thereby reducing refractive-index-guided variation of the optical modes.

BRIEF DESCRIPTION OF DRAWINGS

In order to explain more clearly technical solutions in specific embodiments of the present application or in the prior art, drawings that need to be used in the description of the specific embodiments or the prior art will be briefly introduced below. Apparently, the drawings described below are some embodiments of the present application, and for a person skilled in the art, other drawings may be derived from these drawings without any creative effort.

DETAILED DESCRIPTION OF SPECIFIC EMBODIMENTS

Figure 1:
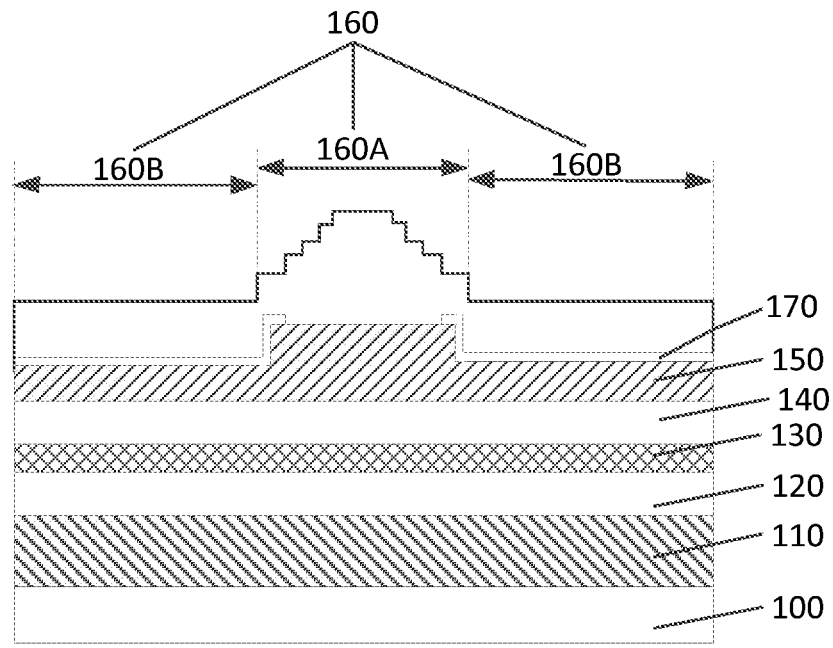
FIG. 1 is a schematic diagram of a lateral-optical-mode-controlled high-power semiconductor device of an embodiment of the present application.

A development trend of high-power light emission devices is to output higher optical power, better beam quality, and higher brightness. Increasing a width of the light emission region of semiconductor light emission structures and manufacturing wide-waveguide semiconductor light emission structures are effective means to increase optical power. A physical size along a slow axis direction of a high-power wide-region semiconductor light emission structure is much larger than its typical working wavelength (0.8 m to 2.0 m), which leads to the tendency of multi-mode emission in the lateral direction, thus greatly reducing its lateral beam quality and limiting the further application of high-power wide-region semiconductor lasers. Therefore, the lateral beam quality is required to be improved on the premise that the width of the light emission region of the high-power wide-region semiconductor light emission structures remains the same, in order to improve performance of semiconductor light emission structures.

High-power wide-region semiconductor light emission structures usually have uneven temperature distribution in its waveguide along with the increase of electrical current, which leads to lateral variation gradient of refractive index and enhances refractive-index-guided variation of the optical modes, causing widened lateral far field. This effect is also called a thermal lens effect. The thermal lens effect is a main reason that causes deterioration of lateral beam quality of high-power wide-region semiconductor light emission structures. At present, there are many technical solutions trying to improve the lateral beam quality of wide-region semiconductor light emission structures, including a method of raising a threshold of high-order lateral modes by introducing an attenuation structure at an edge part of the injection region, and a method of shaping the beam by an external cavity structure. However, there are problems in these technical solutions, such as complicated processes, high manufacturing cost, and increase of volume size of the semiconductor light emission structure.

The present patent application aims to provide a lateral-optical-mode-controlled high-power semiconductor device with improved beam quality of light emission while keeping low cost and high degree of integration.

A clear and complete description of technical solutions of the present application is given below in conjunction with accompanying drawings, and it is apparent that described embodiments are part of and not all of embodiments of the present application. Based on the embodiments described in the present application, all other embodiments obtainable by a person skill in the art without making creative efforts fall within the scope of protection of the present application.

In the description of the present application, it should be noted that terms such as "center", "up", "down", "left", "right", "vertical", "horizontal", "inside", "outside", etc. denote directions or positional relations based on those shown in the drawings, and are only intended for convenience and simplification of describing the present application, and are not intended to indicate or imply that the mentioned device or element must have a particular direction, or must be constructed and operated in a particular orientation, and therefore such terms cannot be construed as a limitation to the present application. Furthermore, terms such as "first", "second" and "third" are only used for descriptive purposes and cannot be understood to indicate or imply relative importance.

Further, the technical features involved in various embodiments of the present application described below may be combined with each other as long as they do not conflict with each other.

Embodiment 1

An embodiment of the present application provides a lateral-optical-mode-controlled high-power semiconductor device, referring to FIG. 1, the device comprises:

a semiconductor substrate layer 100;

an active layer 130, arranged upon the semiconductor substrate layer 100;

a front electrode layer 160, arranged on a side of the active layer 130 away from the semiconductor substrate layer 100, the front electrode layer 160 comprises an electrode injection region 160A; and from a central part of the electrode injection region 160A to an edge part of the electrode injection region 160A along a slow axis direction of the lateral-optical-mode-controlled high-power semiconductor device, thickness of the electrode injection region 160A decreases progressively.

In this embodiment, the lateral-optical-mode-controlled high-power semiconductor device is an edge-emitting semiconductor laser.

Materials of the semiconductor substrate layer 100 comprise silicon, gallium arsenide, or aluminum gallium arsenide. In other embodiments, materials of the semiconductor substrate layer 100 may also be selected from other semiconductor materials, which is not limited herein.

In this embodiment, the device further comprises: a lower confinement layer 110, a lower waveguide layer 120, an upper waveguide layer 140, and an upper confinement layer 150, the lower confinement layer 110 is positioned between the semiconductor substrate layer 100 and the active layer 130, the lower waveguide layer 120 is positioned between the lower confinement layer 110 and the active layer 130, the upper confinement layer 150 is positioned between the active layer 130 and the front electrode layer 160, and the upper waveguide layer 140 is positioned between the upper confinement layer 150 and the active layer 130.

In this embodiment, the device further comprises: a heat sink, arranged opposite to the front electrode layer 160; a weld layer, positioned between the front electrode layer 160 and the heat sink; material of the weld layer comprises gold-tin. Thermal conductivity of the material of the weld layer is lower than that of the material of the front electrode layer 160.

For a region of the weld layer which is arranged on a surface of the electrode injection region on a side away from the active layer 130, thickness of this region of the weld layer increases progressively from a central part of this region of the weld layer to an edge part of this region of the weld layer along a slow axis direction of the lateral-optical-mode-controlled high-power semiconductor device.

The material of the front electrode layer 160 comprises gold. Using gold as the material of the front electrode layer 160 makes the thermal conductivity of the front electrode layer 160 be higher.

It should be noted that, regions of the active layer 130, the upper waveguide layer 140, the upper confinement layer 150, the lower waveguide layer 120 and the lower confinement layer 110 directly under the electrode injection region 160A generate relatively high heat; and in the slow axis direction, the active layer 130 generates the same amount of heat all along from a middle part to an edge part, the upper waveguide layer 140 generates the same amount of heat all along from a middle part to an edge part, the upper confinement layer 150 generates the same amount of heat all along from a middle part to an edge part, the lower waveguide layer 120 generates the same amount of heat all along from a middle part to an edge part, and the lower confinement layer 110 generates the same amount of heat all along from a middle part to an edge part. Heat of the lateral-optical-mode-controlled high-power semiconductor device is transferred in two directions, on one hand, the heat transfers in a direction from the front electrode layer 160 towards the semiconductor substrate layer 100, on the other hand, along the slow axis direction, the heat transfers in a direction from a central part of the front electrode layer 160 to an edge part of the front electrode layer 160.

A semiconductor device provided in a comparison example comprises a semiconductor substrate layer, a lower confinement layer, a lower waveguide layer, an active layer, an upper waveguide layer, an upper confinement layer, and a front electrode layer, wherein the front electrode layer comprises an electrode injection region. In the comparison example, thickness of the electrode injection region is the same from the middle part to the edge part along the slow axis direction, and a heat dissipation path of the middle part of the electrode injection region is longer than that of the edge part, so that a temperature of the film layers under the middle part of the electrode injection region in the comparison example is higher than that of the film layers under the edge part of the electrode injection region.

In this embodiment, from a central part of the electrode injection region 160A to an edge part of the electrode injection region 160A along a slow axis direction of the lateral-optical-mode-controlled high-power semiconductor device, thickness of the electrode injection region 160A decreases progressively. In this way, capability of thermal conduction of the central part of the electrode injection region 160A is increased, and in the slow axis direction, capability of thermal conduction of the central part of the electrode injection region 160A is greater than that of the edge part of the electrode injection region 160A, and along the slow axis direction of the lateral-optical-mode-controlled high-power semiconductor device, capability of thermal conduction of the electrode injection region 160A increases progressively from the edge part of the electrode injection region 160A to the central part of the electrode injection region 160A.

In this embodiment, in the slow axis direction of the lateral-optical-mode-controlled high-power semiconductor device, the central part of the electrode region 160A is relatively thick, and the edge part of the electrode injection region 160A is relatively thin; thickness of the weld layer in a region corresponds to the central part of the electrode injection region 160A is thinner, and thickness of the weld layer in a region corresponds to the edge part of the electrode injection region 160A is thicker. Thermal conductivity of the weld layer is lower than that of the electrode injection region 160A. In this way, even if a heat dissipation path of the middle part of the electrode injection region 160A is longer than a heat dissipation path of the edge part of the electrode injection region 160A, nevertheless, the capability of thermal conduction of the central part of the electrode injection region 160A is greater than that of the edge part of the electrode injection region 160A, and along the slow axis direction of the lateral-optical-mode-controlled high-power semiconductor device, the capability of thermal conduction of the electrode injection region 160A increases progressively from the edge part of the electrode injection region 160A to the central part of the electrode injection region 160A, causing reduction of temperature of the central part of the electrode injection region, thereby reducing a temperature gradient of the electrode injection region 160A in the slow axis direction, and thus reducing a temperature gradient of the active region 130 directly under the electrode injection region 160A in the slow axis direction, which in turn causes reduction of the thermal lens effect. Because of the reduction of the thermal lens effect, the divergence angle in the slow axis direction can be reduced, and also, an order of optical modes along the slow axis direction can be reduced under the same electrical current, which improves the beam quality and increases the light-output brightness of the semiconductor device.

In this embodiment, referring to FIG. 1, from a central part of the electrode injection region 160A to an edge part of the electrode injection region 160A along a slow axis direction of the lateral-optical-mode-controlled high-power semiconductor device, a surface of the electrode injection region 160A away from the active layer 130 has a stepped shape. From the central part of the electrode injection region 160A to the edge part of the electrode injection region 160A, the surface of the electrode injection region 160A away from the active layer 130 has a plurality of steps, and as a distance from a step to the active layer 130 decreases, the height of the step decreases.

In an embodiment, in the slow axis direction of the lateral-optical-mode-controlled high-power semiconductor device, a ratio of the thickness of the central part of the electrode injection region 160A to the thickness of the edge part of the electrode injection region 160A is 2:1~20:1, such as 2:1, 5:1, 8:1, 10:1, 12:1, 15:1, 18:1, or 20:1. If the ratio of the thickness of the central part of the electrode injection region 160A to the thickness of the edge part of the electrode injection region 160A is greater than 20:1, it would result in that the thickness of gold of the central part of the electrode injection region 160A is too large, or the thickness of the edge part of the electrode injection region 160A is too thin, which would cause the welding of the edge part of the electrode injection region 160A to be abnormal, and would easily lead to significant rising of the temperature of the active region; If the ratio of the thickness of the central part of the electrode injection region 160A to the thickness of the edge part of the electrode injection region 160A is less than 2:1, it would result in that the thickness difference between the central part of the electrode injection region 160A and the edge part of the electrode injection region 160A is little, which means little improvement for reducing the thermal lens effect. The ratio of the thickness of the central part of the electrode injection region 160A to the thickness of the edge part of the electrode injection region 160A is 2:1~20:1, this achieves a better balance between reducing the thermal lens effect and preventing significant rising of the temperature of the active region.

In a specific embodiment, the thickness of the central part of the electrode injection region 160A is 2 microns to 10 microns, for example 7 microns, and the thickness of the edge part of the electrode injection region 160A is 0.4 microns to 5 microns, for example, 2 microns.

The front electrode layer 160 further comprises non-injection electrode regions 160B arranged on both sides of the electrode injection region 160A in the slow axis direction.

The lateral-optical-mode-controlled high-power semiconductor device further comprises: an insulation layer 170 positioned between each non-injection electrode region 160B and the upper confinement layer 150, this insulation layer 170 is used to electrically insulate the non-injection electrode region 160B from the upper confinement layer 150.

In an embodiment, thickness of the insulation layer 170 is 0.05 microns to 0.3 microns. Material of the insulation layer 170 comprises silicon oxide.

In this embodiment, parts of the upper confinement layer 150 positioned on both side of the electrode injection region 160A along the slow axis direction are each provided with a groove, and a part of the upper confinement layer 150 positioned under the electrode injection region 160A and between the grooves is used to form a ridge-shaped region. Each non-injection electrode region 160B is positioned in one of the grooves.

In this embodiment, the groove is L-shaped.

In other embodiments, grooves positioned on both sides of the ridge-shaped region may be U-shaped grooves in a cross-section perpendicular to a light emission direction.

In this embodiment, the insulation layer 170 is positioned on a sidewall surface and a bottom surface of the groove. Furthermore, the insulation layer 170 is positioned on a sidewall surface and a bottom surface of the groove and on a top surface of the edge parts of the electrode injection region 160A on both sides thereof along the slow axis direction. The non-injection electrode region 160B also extends into the groove.

It should be noted that, in other embodiments, there may be no ridge-shaped region and no grooves on both sides of any ridge-shaped region in the lateral-optical-mode-controlled high-power semiconductor device.

In this embodiment, FIG. 1 shows an example in which a surface of the electrode injection region 160A away from the active layer 130 has a stepped shape.

Figure 2:
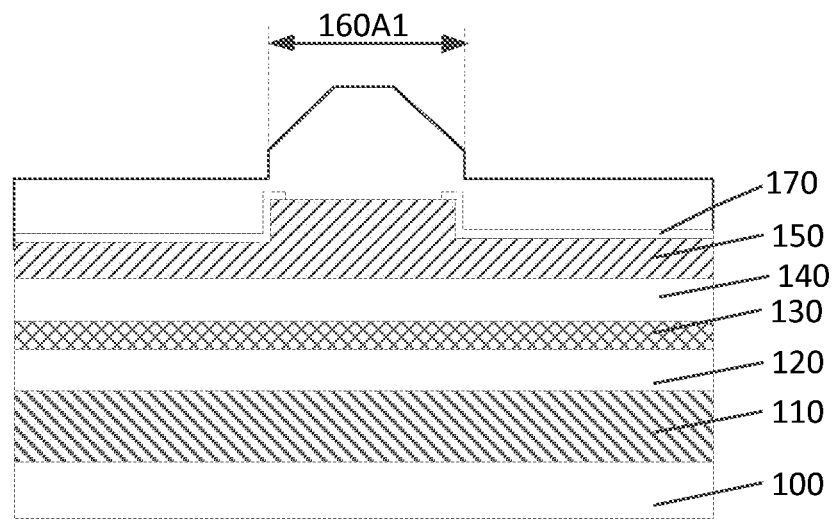
FIG. 2 is a schematic diagram of a lateral-optical-mode-controlled high-power semiconductor device of another embodiment of the present application.

In another embodiment, referring to FIG. 2, the electrode injection region 160A1 has a trapezoid shape in a cross-section perpendicular to a light emission direction.

Figure 3:
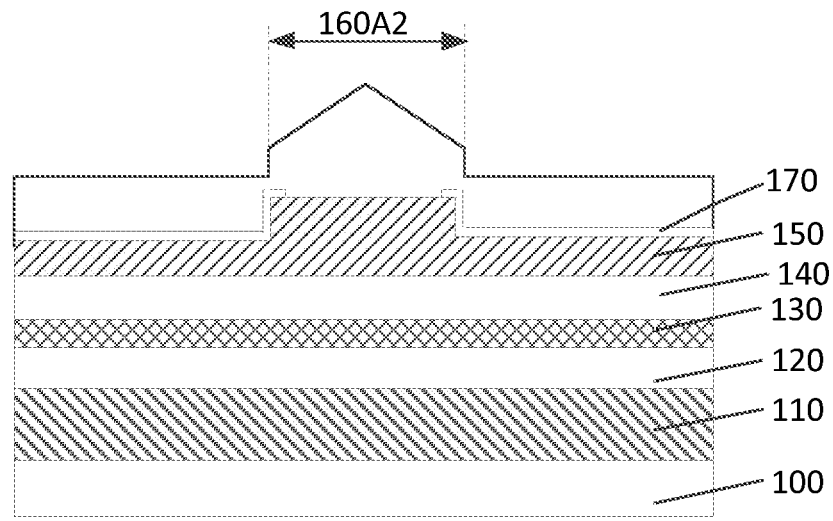
FIG. 3 is a schematic diagram of a lateral-optical-mode-controlled high-power semiconductor device of another embodiment of the present application.

In another embodiment, referring to FIG. 3, the electrode injection region 160A2 has a conical shape in a cross-section perpendicular to a light emission direction.

Figure 4:
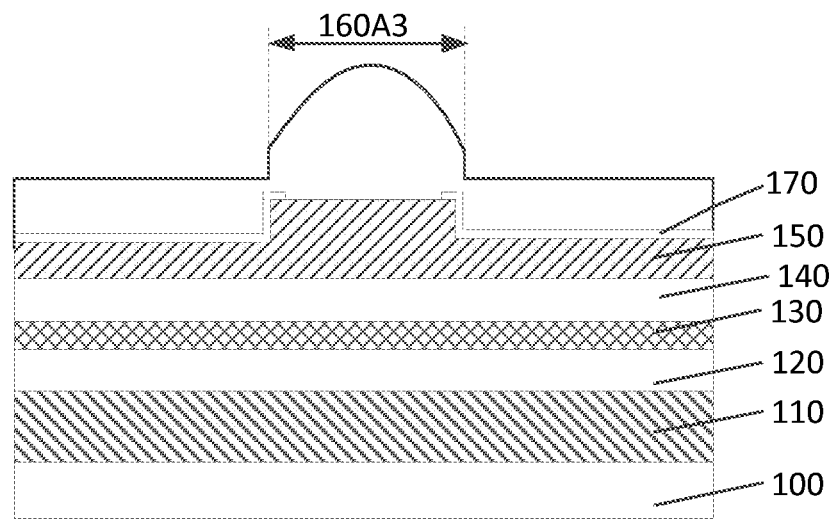
FIG. 4 is a schematic diagram of a lateral-optical-mode-controlled high-power semiconductor device of another embodiment of the present application.

In another embodiment, referring to FIG. 4, the electrode injection region 160A3 has a semicircular shape in a cross-section perpendicular to a light emission direction.

Figure 5:
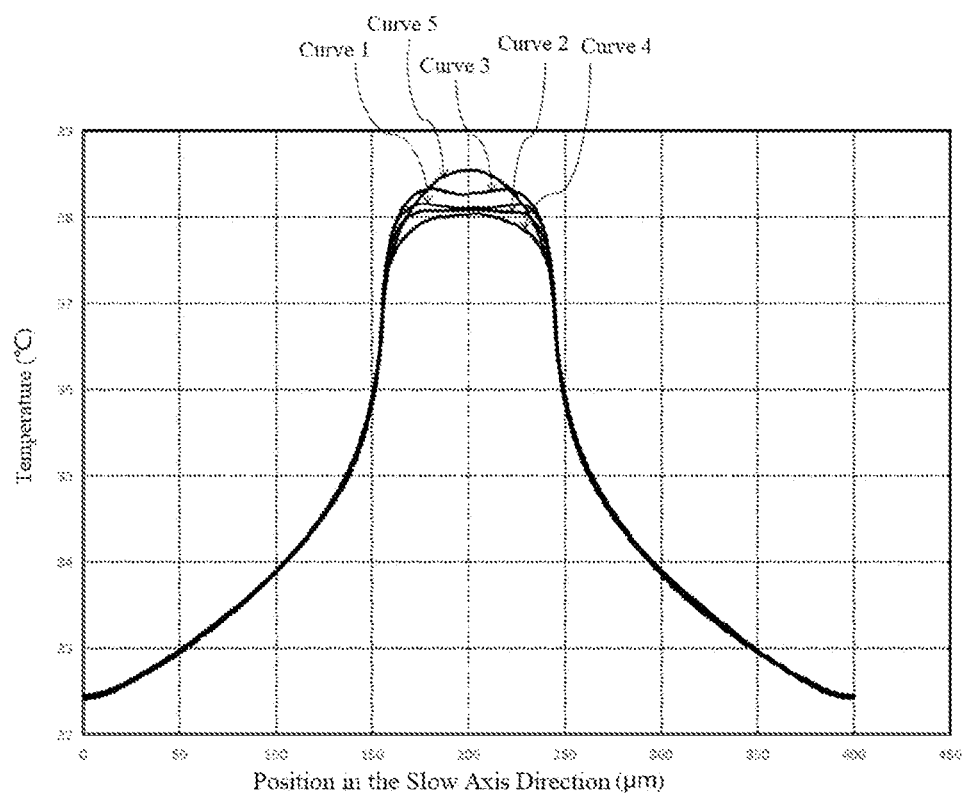
FIG. 5 is a distribution diagram of temperatures, along the slow axis direction, of the active layers of the lateral-optical-mode-controlled high-power semiconductor devices in FIG. 1, FIG. 2, FIG. 3, FIG. 4 and in a comparison example.

With respect to electrode injection regions with different shapes of FIG. 1, FIG. 2, FIG. 3, and FIG. 4, an effect simulation diagram is as shown in FIG. 5, wherein Curve 5 corresponds to the semiconductor device of the comparison example, Curve 3 corresponds to the semiconductor device of FIG. 3, Curve 1 corresponds to the semiconductor device of FIG. 1, Curve 2 corresponds to the semiconductor device of FIG. 2, and Curve 4 corresponds to the semiconductor device of FIG. 4. In FIG. 5, as compared with the comparison example, the temperature of the active layer under the central part of the electrode injection region of each of FIG. 1, FIG. 2, FIG. 3 and FIG. 4 is significantly reduced. As for the semiconductor device of FIG. 3, temperature of the active layer in a region under the central part of the electrode injection region is reduced most significantly relative to the active layer in a region under the edge part of the electrode injection region, a part of its curve corresponding to the position range of axial coordinate of 183 microns to 217 microns has a downwardly concaved shape, but an overall temperature of the active layer of the semiconductor device of FIG. 3 is still relatively high (compared with FIG. 1, FIG. 2, and FIG. 4). In FIG. 5, the curve corresponding to FIG. 1 has a downwardly concaved shape in a part corresponding to the position range of 173 microns to 227 microns, wherein the downwardly concaved shape corresponds to a widened range on the horizontal axis; the curve corresponding to the semiconductor device of FIG. 2 has a downwardly concaved shape in a part corresponding to the position range of 173 microns to 227 microns; and the concave amount of FIG. 1 is increased than that of FIG. 3. As for the semiconductor device of each of FIG. 1 and FIG. 2, the temperature of the active region under the edge part of the electrode injection region is notably reduced; and the unevenness and temperature gradient of the active region of the semiconductor device of each of FIG. 1 and FIG. 2 is also notably reduced. In the semiconductor device of FIG. 4, a shape of the electrode injection region 160A3 in a cross-section perpendicular to the light emission direction is semicircular, and the curve of temperature is well compensated, causing the temperature of the active layer under the central part of the electrode injection region 160A3 to be reduced, without a downwardly concaved shape, and an overall temperature distribution gradient of the active layer is reduced. The semiconductor devices in FIG. 1, FIG. 2 and FIG. 4 all have significant effects of reducing temperature unevenness and temperature gradient, according to a comparison of effects, the semiconductor of FIG. 4 has the best effect.

Embodiment 2

Figure 6:
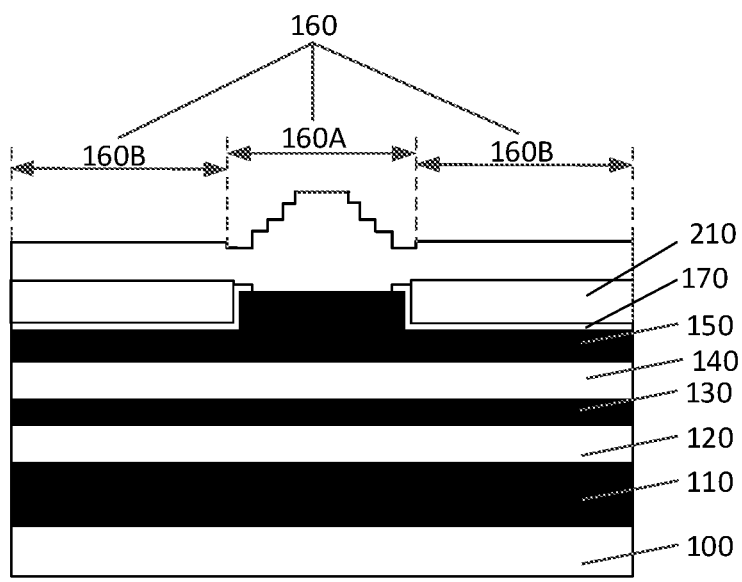
FIG. 6 is a schematic diagram of a lateral-optical-mode-controlled high-power semiconductor device of another embodiment of the present application.

This embodiment is different from Embodiment 1 in that: referring to FIG. 6, the lateral-optical-mode-controlled high-power semiconductor device further comprises: a thermal compensation layer 210, positioned on a side of each non-injection electrode region 160B towards the active layer 130 and in contact with each non-injection electrode region 160B, wherein thermal conductivity of the thermal compensation layer is lower than that of the weld layer.

In this embodiment, since thermal conductivity of the thermal compensation layer 210 is lower than that of the weld layer, which means that the thermal conductivity of the thermal compensation layer 210 is relatively low, and as a result, the semiconductor film layers directly under the thermal compensation layer 210 conducts less heat from the non-injection electrode region 160B, thereby causing the temperature gradient of the active layer 130 directly under the thermal compensation layer 210 to be reduced along the slow axis direction, and causing the variation gradient of refractive index of the semiconductor film layers directly under the thermal compensation layer 210 to be reduced along the slow axis direction, thereby reducing refractive-index-guided variation of the optical modes.

Specifically, the thermal compensation layer 210 is positioned between the insulation layer 170 and the non-injection electrode region 160B. Thickness of the thermal compensation layer 210 is much greater than that of the insulation layer 170.

In an embodiment, the thickness of the thermal compensation layer 210 is 1 micron to 10 microns, such as 1 micron, 2 microns, 3 microns, 4 microns, 5 microns, 6 microns, 7 microns, 8 microns, 9 microns, or 10 microns. If the thickness of the thermal compensation layer 210 is less than 1 micron, the ability of the thermal compensation layer 210 to reduce the heat dissipation from the non-injection electrode region 160B to the active layer 130 directly under the thermal compensation layer 210 is weakened; if the thickness of the thermal compensation layer 210 is greater than 10 microns, continuity between the non-injection electrode region 160B and the electrode injection region 160A would be adversely affected.

In an embodiment, material of the thermal compensation layer 210 comprises silicon oxide.

The thermal compensation layer 210 has a single-layer structure or a multi-layer structure.

When the thermal compensation layer 210 has a multi-layer structure, the thermal compensation layer 210 comprises a plurality of first compensation sub-layers and a plurality of second compensation sub-layers, thermal conductivity of each first compensation sub-layer is greater than that of each second compensation sub-layer, the plurality of first compensation sub-layers and the plurality of second compensation sub-layers are alternately arranged in a direction perpendicular to the semiconductor substrate layer. A ratio of thermal conductivity of the first compensation sub-layer to that of the second compensation sub-layer is greater than 10, e.g., 12 or 15. A ratio of thickness of the first compensation sub-layer to that of the second compensation sub-layer is less than 1/10, e.g., 1/12 or 1/15. The interface between the first compensation sub-layer and the second compensation sub-layer brings a better ability to block thermal conduction.

Parts of the upper confinement layer positioned on both sides of the electrode injection region 160A along the slow axis direction are each provided with a groove, and a part of the upper confinement layer positioned under the electrode injection region 160A and between the grooves forms a ridge-shaped region; each thermal compensation layer 210 is arranged in one of the grooves.

The thermal compensation layer 210 does not cover directly upon the electrode injection region 160A, but exposes the part of the insulation layer 170 covering an edge surface of the electrode injection region 160A.

A projection pattern of the thermal compensation layer 210 on the semiconductor substrate layer 100 and that of the electrode injection region 160A on the semiconductor substrate layer 100 have no overlapping region.

Figure 8:
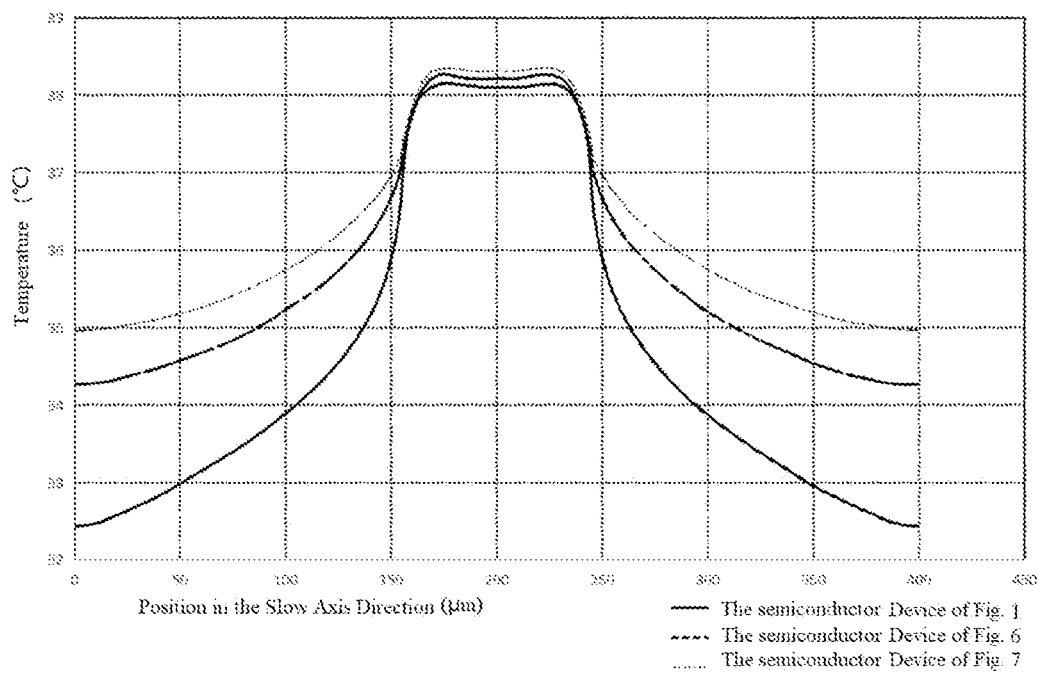
FIG. 8 is a distribution diagram of temperatures, along the slow axis direction, of the active layers of the lateral-optical-mode-controlled high-power semiconductor devices in FIG. 6, FIG. 7 and FIG. 1.

With respect to the thermal compensation layer of FIG. 6, an effect simulation diagram is shown in FIG. 8, the effect of the structure of FIG. 1 is also shown in comparison with the effect of the structure of FIG. 6, by adding the compensation layer, the temperature of the active region under the thermal compensation layer 210 adjacent to the ridge-shaped region is significantly increased, so that the temperature difference between the active layer in the region under the thermal compensation layer 210 and the active layer in the region under the electrode injection region is significantly reduced, and thus the difference of refractive index between the active layer in the region under the thermal compensation layer 210 and the active layer in the region under the electrode injection region is also significantly reduced, thereby significantly reducing the thermal lens effect.

It should be noted that, in other embodiments, there may be no ridge-shaped region and no grooves on both sides of any ridge-shaped region in the lateral-optical-mode-controlled high-power semiconductor device.

It should be noted that, as an example, the surface shape of the electrode injection region in Embodiment 2 is identical to that of the electrode injection region in FIG. 1. The surface shape of the electrode injection region in Embodiment 2 may also optionally be identical to other shapes provided in Embodiment 1. The details of other surface shapes of the electrode injection region in Embodiment 2 can refer to the description of other surface shapes of the electrode injection region in Embodiment 1, and is not described in detail again.

The contents in this embodiment that are identical to those in the preceding embodiment are not described in detail again.

Embodiment 3

Figure 7:
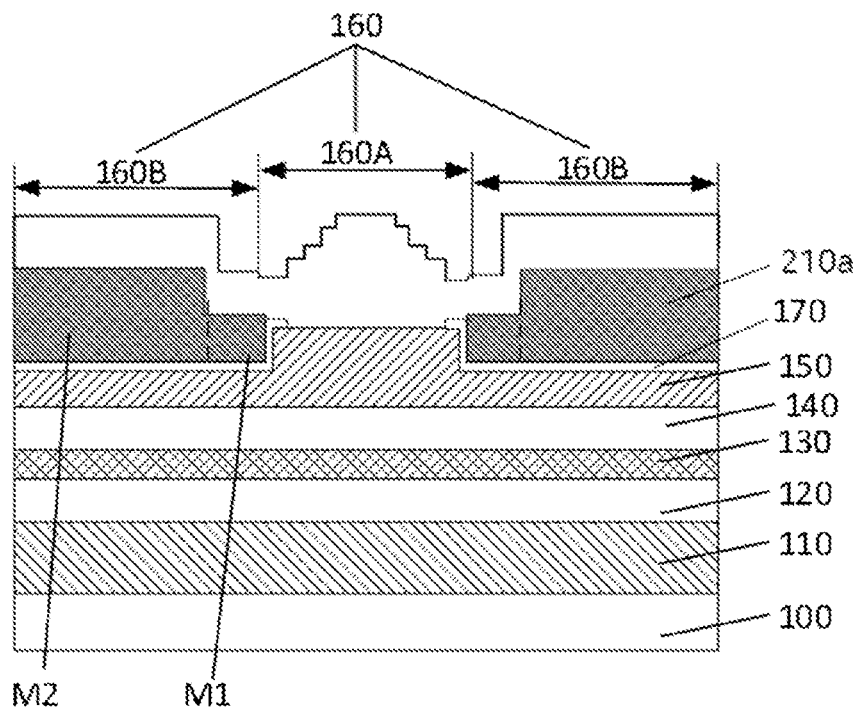
FIG. 7 is a schematic diagram of a lateral-optical-mode-controlled high-power semiconductor device of another embodiment of the present application.

This embodiment is different from Embodiment 2 in that: referring to FIG. 7, the thermal compensation layer 210a comprises a first compensation region M1 and a second compensation region M2 juxtaposed in the slow axis direction, and a distance from the first compensation region M1 to the electrode injection region 160A is less than a distance from the second compensation region M2 to the electrode injection region 160A; thickness of the second compensation region M2 is greater than that of the first compensation region M1.

With respect to the thermal compensation layer in FIG. 7, an effect simulation diagram is as shown in FIG. 8, and the effects of the structures of FIG. 1 and FIG. 6 are also shown in comparison with the effect of the structure of FIG. 7. By increasing the thickness of the second compensation region M2, the temperature of the active layer in the region under the first compensation region M1 adjacent to the ridge-shaped region is further increased, so that the temperature difference between the active layer in the region under the first compensation region M1 and the active layer in the region under the electrode injection region is further reduced, and thus the difference of refractive index between the active layer in the region under the first compensation region M1 and the active layer in the region under the electrode injection region is also further reduced, thereby further reducing the thermal lens effect.

It should be noted that, as an example, the surface shape of the electrode injection region in Embodiment 3 is identical to that of the electrode injection region in FIG. 1. The surface shape of the electrode injection region in Embodiment 3 may also optionally be identical to other shapes provided in Embodiment 1. The details of other surface shapes of the electrode injection region in Embodiment 3 can refer to the description of other surface shapes of the electrode injection region in Embodiment 1, and is not described in detail again.

The contents in this embodiment that are identical to those in the preceding embodiments are not described in detail again.

Embodiment 4

This embodiment provides a method for manufacturing a lateral-optical-mode-controlled high-power semiconductor device, comprising:
S1: providing a semiconductor substrate layer;
S2: forming an active layer upon the semiconductor substrate layer;
S3: forming a front electrode layer on a side of the active layer away from the semiconductor substrate layer, wherein the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively.

The process of forming a front electrode layer on a side of the active layer away from the semiconductor substrate layer comprises: forming an initial front electrode film on a side of the active layer away from the semiconductor substrate layer, wherein the initial front electrode film comprises an initial electrode injection region; etching the initial electrode injection region to cause the initial electrode injection region to be formed into the electrode injection region and cause the initial front electrode film to be formed into the front electrode layer.

In an embodiment, from a central part of the electrode injection region to an edge part of the electrode injection region along a slow axis direction of the lateral-optical-mode-controlled high-power semiconductor device, a surface of the electrode injection region away from the active layer has a stepped shape. Correspondingly, the step of etching the initial electrode injection region comprises: forming a photoresist layer on the initial front electrode film; patterning the photoresist layer to form an opening in the photoresist layer, wherein the opening exposes a part of the initial electrode injection region; taking the patterned photoresist layer as a mask and etching a partial thickness of the initial electrode injection region under the opening; repeating the steps of patterning the photoresist layer and etching a partial thickness of the initial electrode injection region under the opening, until a surface of the initial electrode injection region exposed by the opening is formed into a stepped shape; and then removing the photoresist layer.

In other embodiments, the electrode injection region has a trapezoid shape in a cross-section perpendicular to a light emission direction; or, the electrode injection region has a conical shape in a cross-section perpendicular to a light emission direction; or, the electrode injection region has a semicircular shape in a cross-section perpendicular to a light emission direction.

In this embodiment, the method further comprises: providing a heat sink; welding the heat sink onto the front electrode layer by using a weld layer; wherein, from a central part of the weld layer to an edge part of the weld layer along a slow axis direction of the lateral-optical-mode-controlled high-power semiconductor device, thickness of the weld layer in a region corresponds to the electrode injection region increases progressively.

The front electrode layer further comprises non-injection electrode regions arranged on both sides of the electrode injection region in the slow axis direction; the method for manufacturing a lateral-optical-mode-controlled high-power semiconductor device further comprises: before forming the front electrode layer, forming a thermal compensation layer on a part of the active layer on a side thereof away from the semiconductor substrate layer; and after forming the front electrode layer, the thermal compensation layer becomes arranged on a side of each non-injection electrode region towards the active layer and in contact with each non-injection electrode region, wherein thermal conductivity of the thermal compensation layer is lower than that of the weld layer.

The method for manufacturing a lateral-optical-mode-controlled high-power semiconductor device further comprises: before forming the thermal compensation layer, forming an upper confinement layer on a side of the active layer away from the semiconductor substrate layer; and forming grooves in the upper confinement layer to delimit a ridge-shaped region; the step of forming a thermal compensation layer on a part of the active layer on a side thereof away from the semiconductor substrate layer comprises: forming the thermal compensation layer in each of the grooves.

The active layer comprises a first active region and second active regions arranged on both sides of the first active region in a slow axis direction; the process of forming the thermal compensation layer comprises: forming an initial thermal compensation film on a side of each of the second active regions away from the semiconductor substrate layer, wherein the initial thermal compensation film exposes the first active region, the initial thermal compensation film comprises a first initial thermal compensation region and a second initial thermal compensation region juxtaposed in the slow axis direction, a distance from the first initial thermal compensation region to the first active region is less than a distance from the second initial thermal compensation region to the first active region; etching a surface of the first initial thermal compensation region on a side thereof away from the second active region to cause the first initial thermal compensation region to be formed into a first compensation region and cause the second initial thermal compensation region to be formed into a second compensation region, so as to cause the initial thermal compensation film to be formed into the thermal compensation layer; wherein thickness of the second compensation region is greater than that of the first compensation region.

Structural details of the lateral-optical-mode-controlled high-power semiconductor device mentioned in the method can refer to the description in the preceding embodiments, and is not described in detail again.

Apparently, the aforesaid embodiments are merely examples illustrated for clearly describing the present application, and are not intended to limit the implementing ways thereof. For a person skilled in the art, different forms of modifications or changes can be made based on the aforesaid description. It is unnecessary and impossible to list all the implementing ways herein. And any obvious changes or modifications derived therefrom are still within the scope of protection of the present application.

The invention claimed is:
1. A lateral-optical-mode-controlled high-power semiconductor device, comprising:
a semiconductor substrate layer;
an active layer, arranged upon the semiconductor substrate layer;

a front electrode layer, arranged on a side of the active layer away from the semiconductor substrate layer, the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively; and a weld layer, arranged on a surface on a side of the electrode injection region away from the active layer, and from a central part of the weld layer to an edge part of the weld layer along a slow axis direction of the lateral-optical-mode-controlled high-power semiconductor device, thickness of the weld layer increases progressively;

wherein the front electrode layer further comprises non-injection electrode regions arranged on both sides of the electrode injection region in the slow axis direction;

the lateral-optical-mode-controlled high-power semiconductor device further comprises: a thermal compensation layer, arranged on a side of each non-injection electrode region towards the active layer and in contact with each non-injection electrode region; thermal conductivity of the thermal compensation layer is lower than that of the weld layer;

the lateral-optical-mode-controlled high-power semiconductor device further comprises: an upper confinement layer arranged between the active layer and the front electrode layer; parts of the upper confinement layer positioned on both sides of the electrode injection region along the slow axis direction are each provided with a groove, and a part of the upper confinement layer positioned under the electrode injection region and between the grooves forms a ridge-shaped region; each thermal compensation layer is arranged in one of the grooves.

2. The lateral-optical-mode-controlled high-power semiconductor device according to claim 1, wherein, from a central part of the electrode injection region to an edge part of the electrode injection region along a slow axis direction of the lateral-optical-mode-controlled high-power semiconductor device, a surface of the electrode injection region away from the active layer has a stepped shape; or, the electrode injection region has a trapezoid shape in a cross-section perpendicular to a light emission direction; or, the electrode injection region has a conical shape in a cross-section perpendicular to a light emission direction; or, the electrode injection region has a semicircular shape in a cross-section perpendicular to a light emission direction.

3. The lateral-optical-mode-controlled high-power semiconductor device according to claim 1, wherein, a ratio of thickness of the central part of the electrode injection region to thickness of the edge part of the electrode injection region is 2:1~20:1.

4. The lateral-optical-mode-controlled high-power semiconductor device according to claim 1, wherein, thickness of the central part of the electrode injection region is 2 microns to 10 microns, and thickness of the edge part of the electrode injection region is 0.4 micron to 5 microns.

5. The lateral-optical-mode-controlled high-power semiconductor device according to claim 1, wherein, thickness of the thermal compensation layer is 1 micron to 10 microns.

6. The lateral-optical-mode-controlled high-power semiconductor device according to claim 1, wherein, material of the thermal compensation layer comprises silicon oxide.

7. The lateral-optical-mode-controlled high-power semiconductor device according to claim 1, wherein, the thermal compensation layer comprises a first compensation region and a second compensation region juxtaposed in the slow axis direction, and a distance from the first compensation region to the electrode injection region is less than a distance from the second compensation region to the electrode injection region; thickness of the second compensation region is greater than that of the first compensation region.

8. The lateral-optical-mode-controlled high-power semiconductor device of claim 7, wherein, a surface on a side of the first compensation region away from the active layer has a stepped shape.

9. The lateral-optical-mode-controlled high-power semiconductor device according to claim 1, wherein, the thermal compensation layer comprises a plurality of first compensation sub-layers and a plurality of second compensation sub-layers, thermal conductivity of each first compensation sub-layer is greater than that of each second compensation sub-layer, the plurality of first compensation sub-layers and the plurality of second compensation sub-layers are alternately arranged in a direction perpendicular to the semiconductor substrate layer.

10. A method for manufacturing a lateral-optical-mode-controlled high-power semiconductor device, comprising:

providing a semiconductor substrate layer;

forming an active layer upon the semiconductor substrate layer;

forming a front electrode layer on a side of the active layer away from the semiconductor substrate layer, wherein the front electrode layer comprises an electrode injection region; and from a central part of the electrode injection region to an edge part of the electrode injection region along a slow axis direction of the lateral-optical-mode-controlled high-power semiconductor device, thickness of the electrode injection region decreases progressively; and providing a heat sink; welding the heat sink onto the front electrode layer by using a weld layer; wherein, from a central part of the weld layer to an edge part of the weld layer along a slow axis direction of the lateral-optical-mode-controlled high-power semiconductor device, thickness of the weld layer in a region corresponds to the electrode injection region increases progressively;

wherein the front electrode layer further comprises non-injection electrode regions arranged on both sides of the electrode injection region in the slow axis direction;

the method for manufacturing a lateral-optical-mode-controlled high-power semiconductor device further comprises: before forming the front electrode layer, forming a thermal compensation layer on a part of the active layer on a side thereof away from the semiconductor substrate layer; and after forming the front electrode layer, the thermal compensation layer becomes arranged on a side of each non-injection electrode region towards the active layer and in contact with each non-injection electrode region, wherein thermal conductivity of the thermal compensation layer is lower than that of the weld layer;

the method for manufacturing a lateral-optical-mode-controlled high-power semiconductor device further comprises: before forming the thermal compensation layer, forming an upper confinement layer on a side of the active layer away from the semiconductor substrate layer; and forming grooves in the upper confinement layer to delimit a ridge-shaped region;

wherein the step of forming a thermal compensation layer on a part of the active layer on a side thereof away from the semiconductor substrate layer comprises: forming the thermal compensation layer in each of the grooves.

11. The method according to claim 10 for manufacturing a lateral-optical-mode-controlled high-power semiconductor device, wherein, the process of forming a front electrode layer on a side of the active layer away from the semiconductor substrate layer comprises: forming an initial front electrode film on a side of the active layer away from the semiconductor substrate layer, wherein the initial front electrode film comprises an initial electrode injection region; etching the initial electrode injection region to cause the initial electrode injection region to be formed into the electrode injection region and cause the initial front electrode film to be formed into the front electrode layer.

12. The method according to claim 11 for manufacturing a lateral-optical-mode-controlled high-power semiconductor device, wherein, from a central part of the electrode injection region to an edge part of the electrode injection region along a slow axis direction of the lateral-optical-mode-controlled high-power semiconductor device, a surface of the electrode injection region away from the active layer has a stepped shape;

the step of etching the initial electrode injection region comprises: forming a photoresist layer on the initial front electrode film; patterning the photoresist layer to form an opening in the photoresist layer, wherein the opening exposes a part of the initial electrode injection region; taking the patterned photoresist layer as a mask and etching a partial thickness of the initial electrode injection region under the opening; repeating the steps of patterning the photoresist layer and etching a partial thickness of the initial electrode injection region under the opening, until a surface of the initial electrode injection region exposed by the opening is formed into a stepped shape; and then removing the photoresist layer.

13. The method according to claim 10 for manufacturing a lateral-optical-mode-controlled high-power semiconductor device, wherein, the electrode injection region has a trapezoid shape in a cross-section perpendicular to a light emission direction; or, the electrode injection region has a conical shape in a cross-section perpendicular to a light emission direction; or, the electrode injection region has a semicircular shape in a cross-section perpendicular to a light emission direction.

14. The method according to claim 10 for manufacturing a lateral-optical-mode-controlled high-power semiconductor device, wherein, the active layer comprises a first active region and second active regions arranged on both sides of the first active region in a slow axis direction;

the process of forming the thermal compensation layer comprises: forming an initial thermal compensation film on a side of each of the second active regions away from the semiconductor substrate layer, wherein the initial thermal compensation film exposes the first active region, the initial thermal compensation film comprises a first initial thermal compensation region and a second initial thermal compensation region juxtaposed in the slow axis direction, a distance from the first initial thermal compensation region to the first active region is less than a distance from the second initial thermal compensation region to the first active region; etching a surface of the first initial thermal compensation region on a side thereof away from the second active region to cause the first initial thermal compensation region to be formed into a first compensation region and cause the second initial thermal compensation region to be formed into a second compensation region, so as to cause the initial thermal compensation film to be formed into the thermal compensation layer; wherein thickness of the second compensation region is greater than that of the first compensation region.

* * * * *